United States Patent [19]

Macierewicz

[11] Patent Number: 4,797,203

[45] Date of Patent: Jan. 10, 1989

[54] REVERSE HYDROCYCLONE CLEANER FOR REMOVING LIGHT CONTAMINANTS FROM PULP SLURRY

[75] Inventor: Jacek J. Macierewicz, Calgary, Canada

[73] Assignee: ELP Products Limited, Calgary, Canada

[21] Appl. No.: 932,251

[22] Filed: Nov. 19, 1986

[30] Foreign Application Priority Data

Feb. 22, 1986 [GB] United Kingdom ................. 8604462

[51] Int. Cl.[4] ............................................ B01D 3/00

[52] U.S. Cl. ...................................... 209/211; 55/449; 55/459.1; 210/512.1

[58] Field of Search ............... 209/20, 211; 210/512.1, 210/512.2; 55/449, 459 R; 162/55

[56] References Cited

U.S. PATENT DOCUMENTS

| | | | |
|---|---|---|---|
| 2,757,581 | 8/1956 | Freeman | 209/211 |
| 3,425,545 | 2/1969 | Zemanek | 209/211 |
| 3,512,651 | 5/1970 | Laval, Jr. | 209/211 |
| 3,543,932 | 12/1970 | Rostatter | 209/211 |
| 3,802,570 | 4/1974 | Dehne | 209/211 |
| 3,912,579 | 10/1975 | Braun | 209/211 |
| 3,928,186 | 12/1975 | Zemanek | 209/211 |
| 4,163,719 | 8/1979 | Macierewicz | 209/211 |
| 4,305,825 | 12/1981 | Laval, Jr. | 209/211 |
| 4,676,809 | 6/1987 | Fjällström et al. | 209/211 |

FOREIGN PATENT DOCUMENTS 1138378 3/1980 Canada .

OTHER PUBLICATIONS

"Theory, Applications and Practical Operation of Hydrocyclones" *e/mj,* Dr. H. Trawinski, Sep. 1976, pp. 115–127.

*Primary Examiner*—Robert B. Reeves
*Assistant Examiner*—Donald Hajec
*Attorney, Agent, or Firm*—Robert F. Delbridge; Arne I. Fors

[57] ABSTRACT

A reverse hydrocyclone cleaner for removing light contaminants from pulp slurry has a housing defining a hydrocyclone separating chamber. Pulp slurry is fed into the separating chamber adjacent an upper end thereof to form an outer helically and downwardly moving slurry stream relatively free from light contaminants, an inner pulp stream containing a substantial amount of the light contaminants and an air core within the inner stream. An overflow orifice is located adjacent an upper end of the separating chamber, and an underflow orifice is located adjacent a lower end of the separating chamber to remove the outer pulp stream relatively free from light contaminants. A centrally located blocking finger is located in the underflow orifice. The outer pulp stream passes around the blocking finger, which has a substantially flat upper surface of sufficient diameter to define lower limits of both the air core and the inner pulp stream and cause the inner pulp stream containing a substantial amount of the light contaminants to travel upwardly in the separating chamber in a helical manner around the air core to and through the overflow orifice.

6 Claims, 4 Drawing Sheets

Figure 1:
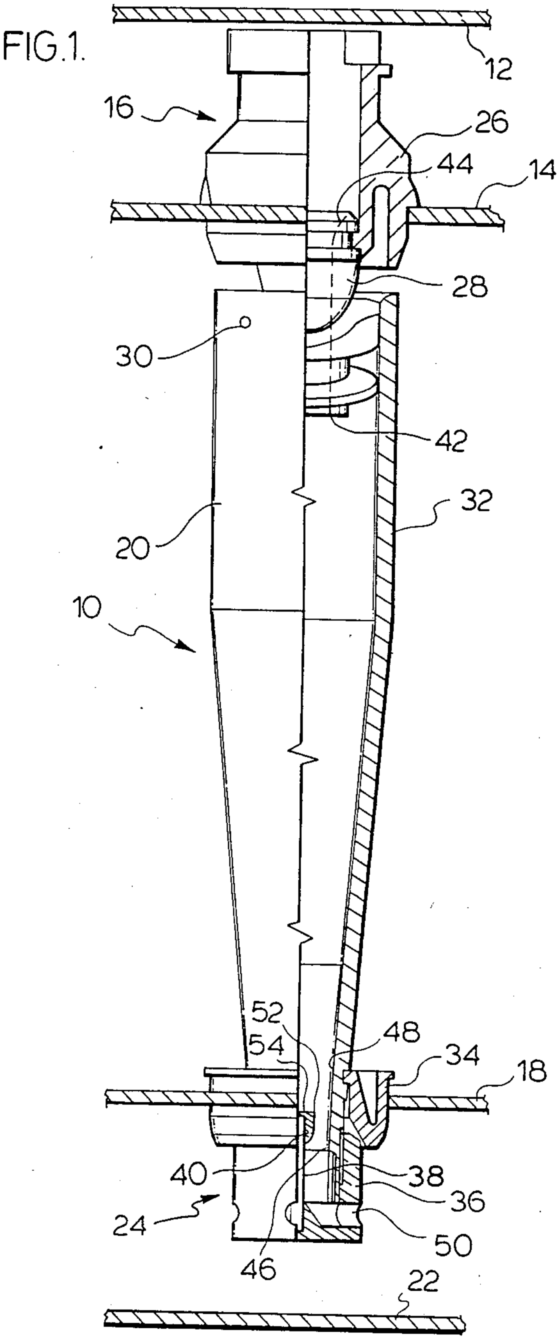

Total Capacity Required: 9222 + 3101 + 837 = 13,160 L/min.

Total Power Required: $P = \frac{P_F Q}{6400} = \frac{30 \times 13160}{6400} = 61.69$ H.P.

Total Capacity Required: 10163 + 5622 + 2417 = 18,202 L/min.

Total Power Required: $P = \frac{P_F \times Q}{6400} = \frac{46 \times 18{,}202}{6400} = 130.83$ H.P.

REVERSE HYDROCYCLONE CLEANER FOR REMOVING LIGHT CONTAMINANTS FROM PULP SLURRY

This invention relates to a reverse hydrocyclone cleaner for removing light contaminants from pulp slurry.

Forward hydrocyclone cleaners are used for removing heavy contaminants from water based pulp suspension. "Heavy" means that the contaminant particles are heavier than water, and are either heavier than the pulp fibres or are in the same range of specific gravity but are of more concentrated shape which makes them more prone to rejection than fibres which are of high length to diameter ratio. Heavy contaminants are pushed towards the wall of a hydrocyclone by the action of centrifugal forces and spiral down to be discharged through the underflow orifice. Since the fibres are also heavier than water, they will tend to move in the same direction as the heavy contaminants. However, space limitations in the constricted area of the underflow orifice allow for only about 20% of all the solids to be discharged there. Thus, heavy contaminants are preferentially discharged. The balance is forced to the upgoing inside vortex and exits through the overflow orifice.

Reverse hydrocyclones are used for the removal of light contaminants from pulp suspension. The need for this type of cleaner has arisen from increasing use of recycled paper, for example waste paper, deinked paper and waste fibre. Light contaminants in suspensions produced from such paper are usually non-fibrous materials present in recycled books, magazines, boxes and the like. Such light contaminants are lighter than the fibres and water, and may comprise latexes, waxes, hot melts, styrofoam, polypropylene and polyethylene. Such light contaminants collect inside the hydrocyclone around the air core under the influence of forces caused by rotation of the pulp suspension. The light contaminants, together with lighter or easier to remove fibres (because of their shape), will be discharged with the upgoing stream through the overflow orifice. The majority of the fibres (for example from about 80 to about 90% by weight) being heavier than water, will proceed downwardly and be discharged through the underflow orifice.

For reverse cleaning, hydrocyclones of from about 60 to about 100 mm in major diameter are usually used, the most practical diameter being from about 75 to about 80 mm. Larger hydrocyclones would develop lower centrifugal forces, while smaller hydrocyclones would require higher installation costs. Such hydrocyclones are usually converted from forward cleaners by changing the inlet, underflow and overflow diameters as well as the operating parameters.

For example, a typical remodelling of a forward cleaner to produce a reverse cleaner would be as follows:

(a) Feed area increased by up to about 30%.

(b) Accept underflow orifice area increased by up to about 1200%.

(c) Overflow orifice area decreased by from about 10% to about 320%.

The increase in the feed inlet area is needed to obtaining a similar capacity for the reverse cleaner as for the forward cleaner at similar feed-to-accept pressure differentials. This clearly indicates that the flow resistance of a resultant reverse cleaner is much greater than the equivalent forward cleaner. This is primarily because the majority of the total flow rate has to work against the narrowing down towards underflow heavy fraction discharge.

The significant increase in the underflow orifice diameter is to obtain in the accept at least 50% of the total volumetric throughput and at least 75% of good fibres. Otherwise, as the exit through a standard underflow orifice is inefficient from a hydraulic point of view, the majority of this fraction would go to the overflow as in a forward cleaner.

The decrease of the overflow orifice area is firstly to discharge from about 20 to about 50% by volume compared to about 90% in a forward cleaner, and secondly to help the discharge of the remaining volume through the orifice by applying back pressure. It has been found that the sizing of the underflow and overflow orifices has to provide very similar velocities for both fractions. If not, the air core with adjacent layer of light contaminant fraction will become stagnant or even wander towards the underflow resulting in poor cleaning efficiency.

The majority of the present reverse cleaners also require pressure differentials of from about 30 to about 90 psi, i.e. an average which is about twice that of a forward cleaner. This need of high pressures, which means high rate of rotational motion, is to obtain sufficient cleaning efficiency. With low pressure differential, the upward component of reaction against the centrifugal force on a converging conical wall of the cleaner is such that, instead of the fluid with fibre at the wall proceeding towards the underflow, the internal portion of light contaminants and fibre surrounding the air core will be accepted there. Applying high pressures, the hydraulic push at the wall is sufficient to force the outer layers to the underflow, at the same time displacing the surrounding layers of the air core upwards to the overflow orifice. Thus, the included angle of the cone before the underflow is of major importance. Cone angles of standard forward and converted reverse cleaners are usually above about 8 degrees.

Another type of reverse hydrocyclone utilizes a "uniflow" concept, which involved providing the supply of slurry at a wide end of the cleaner and discharging both the clean heavy fraction and the light contaminant fraction at the cylindrically divided narrow opposite end. The heavy fraction is discharged from the annular region between the conical wall of the cleaner and the inside pipe, and the light fraction is removed from the centre of the cleaner through the inside pipe. The flows of both fractions are in the vertical sense. Such cleaners have the following advantages:

(a) Low feed to accept pressure differentials may be used, thus enabling them to be low pressure cleaners, i.e. below about 20 psi.

(b) The light rejected fraction contains very little fibre and high contaminant concentration. The disadvantages however are as follows:

(a) The accept fraction is considerably dirty, due to the large angle of descent of the spiralling fluid, and the larger discharge diameter of the heavy fraction and thus lower centripetal accelerations.

(b) High accept to reject pressure differentials are required for reasonable cleaning conditions since the two fractions are taken from substantially different radii.

(c) Difficulty in control of reject rates for higher range of feed to accept pressure differentials (above 14 psi). Reject rates remain almost constant, regardless of the accept to reject pressure differentials.

It will be readily appreciated from the above that, if low pressure differentials can be used and also if lower volumetric fractions are forced to the overflow, together with light contaminants, without sacrificing the cleaning efficiency, the gain will be two-fold because pumping costs will be lower and installation costs of a complete multistage system will also be lower. It is therefore an object of the invention to provide a reverse hydrocyclone cleaner in which the above-mentioned difficulties are substantially overcome.

According to the present invention, a reverse hydrocyclone cleaner for removing light contaminants from pulp slurry comprises a housing defining a hydrocyclone separating chamber, and means for feeding pulp slurry into the separating chamber adjacent an upper end thereof to form an outer helically and downwardly moving slurry stream relatively free from light contaminants, an inner pulp stream containing a substantial amount of said light contaminants and an air core within said inner stream. The cleaner also has an overflow orifice adjacent an upper end of the separating chamber, and an underflow orifice adjacent a lower end of the separating chamber to remove the outer pulp stream relatively free from light contaminants. A centrally located blocking finger is provided in the underflow orifice and around which the outer pulp stream passes. The blocking finger has a substantially flat upper surface of sufficient diameter to define lower limits of both the air core and the inner pulp stream and cause the inner pulp stream containing a substantial amount of the light contaminants to travel upwardly in the separating chamber in a helical manner around the air core to and through the overflow orifice.

Advantageously, the blocking finger blocks from about 15 to about 25% of the area of the underflow orifice, the blocking finger having a top portion with a diameter which is from about 2 to about 3 times the diameter of the air core or, in other words, from about 15 to about 25% of the diameter of the separating chamber at feed entry.

The separating chamber may have a conical section adjacent the blocking finger, it having been found that such a conical section should preferably have an included angle of from about 4 to about 6 degrees.

The pulp slurry may be fed into the upper end of the separation chamber at a pressure in the range of from about 20 to about 35 psig with a pressure in the range of from about 8 to about 15 psig being maintained at the underflow orifice to remove the outer pulp stream relatively free from light contaminants, and with a pressure in the range of from about 1 to about 6 psig being maintained at the overflow orifice to remove the inner pulp stream containing a substantially high amount of light contaminants and air.

The pressure at the underflow orifice may be maintained lower than the feed pressure by an amount in the range of from about 12 to about 21 psi according to the feed flow rate required.

Figure 2:
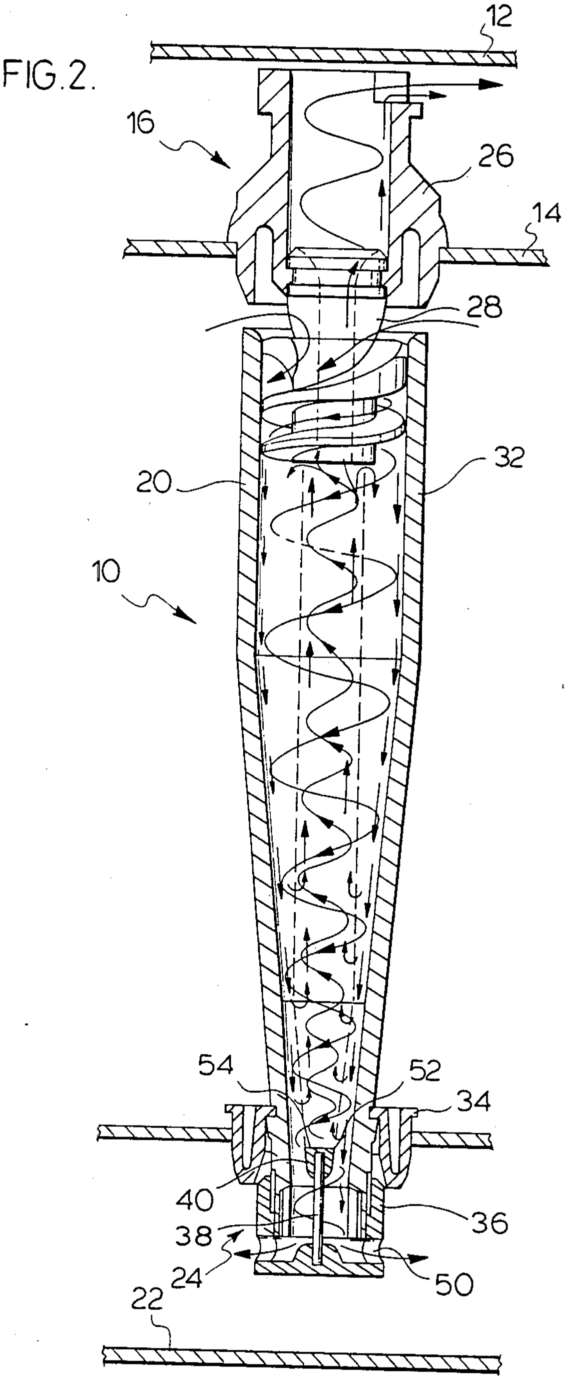
Figure 3:
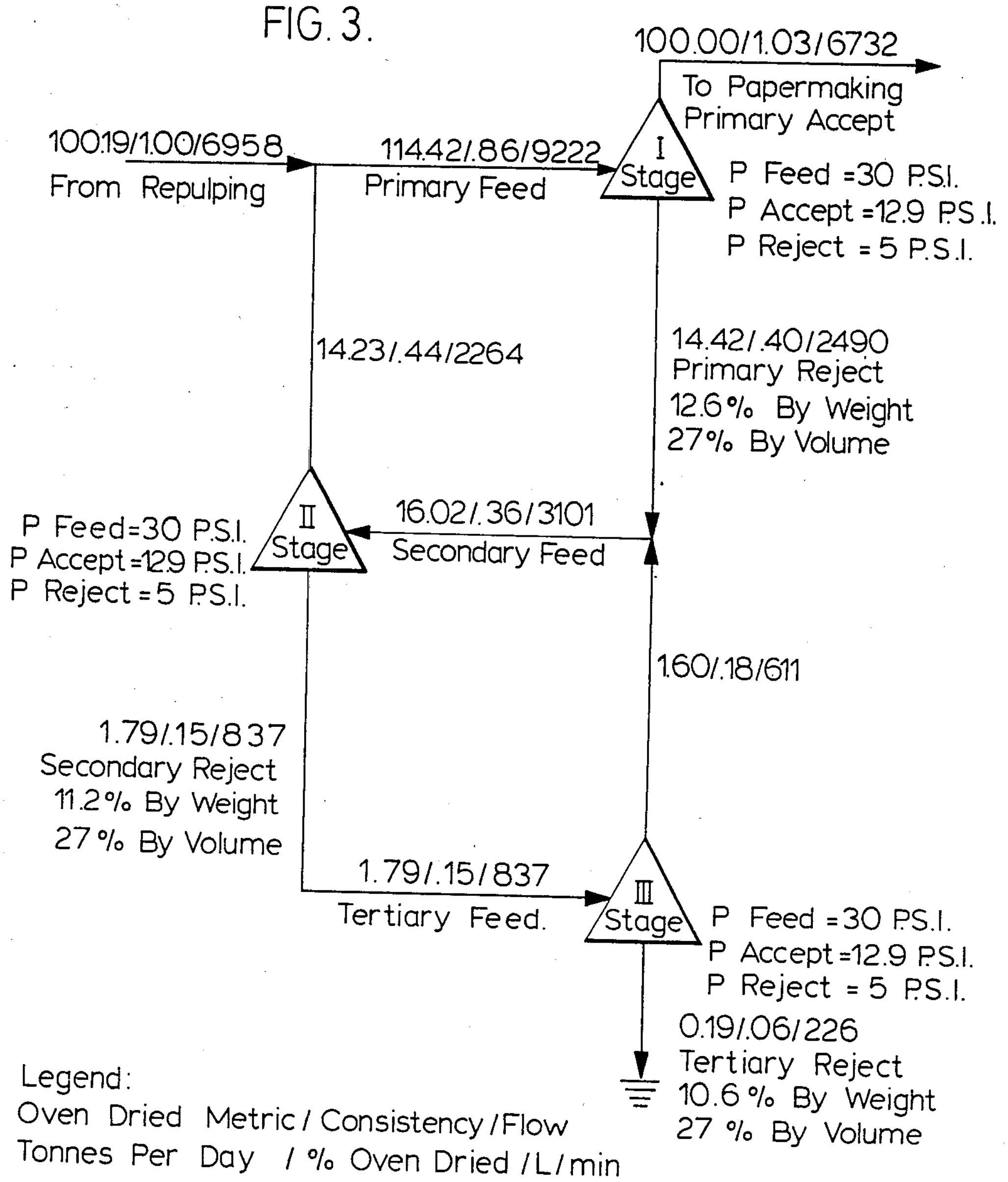
Figure 4:
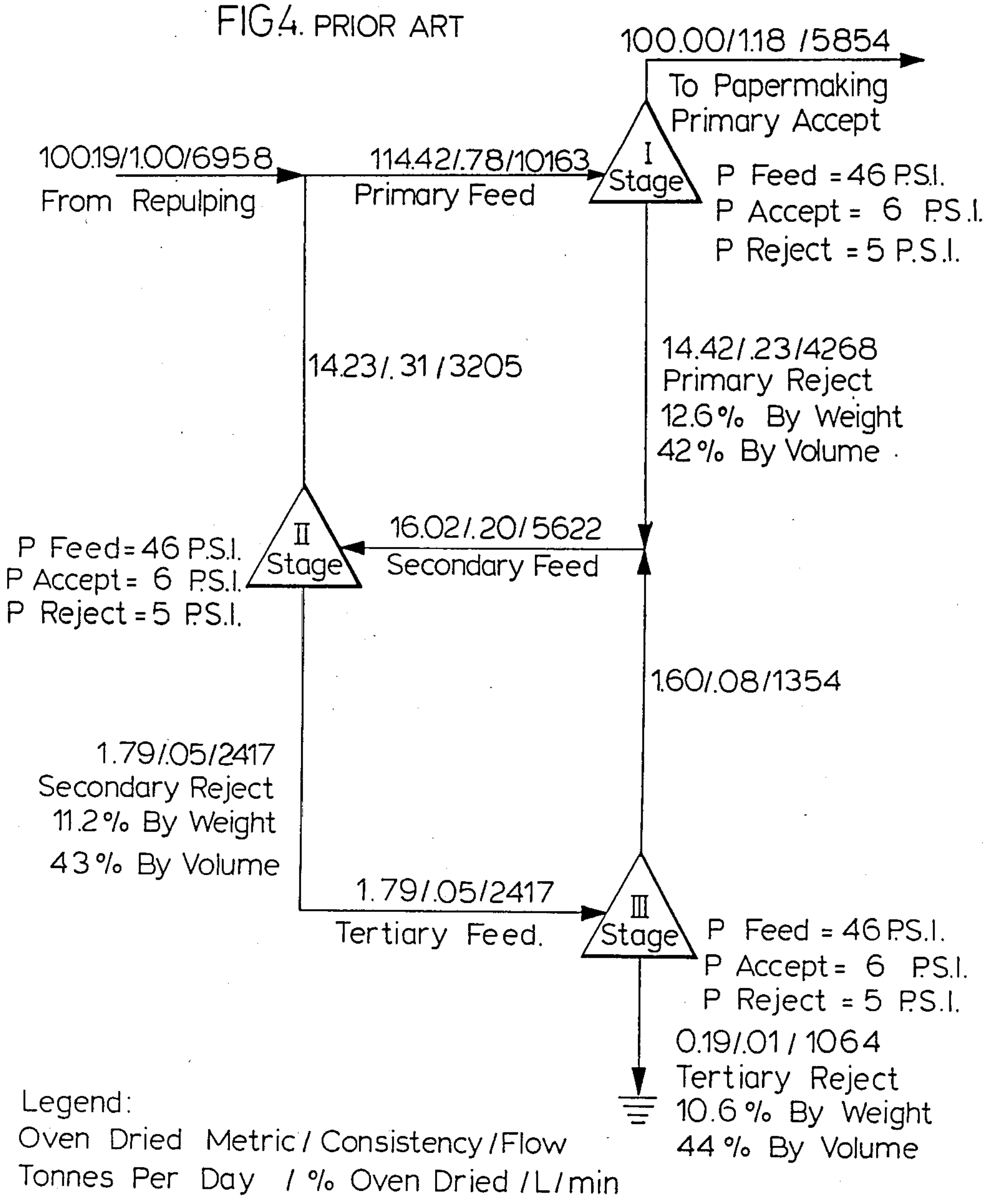
FIG 4. PRIOR ART

One embodiment of the invention will now be described, by way of example, with reference to the accompanying drawings, of which:

FIG. 1 is a side view, partly in section, of a reverse hydrocyclone in accordance with the invention, FIG. 2 is a sectional view showing inside flow patterns thereof, FIG. 3 is a flow diagram of a three-stage cleaning system utilizing the reverse hydrocyclone of the present invention, and FIG. 4 is an equivalent flow diagram for a prior art reverse cleaner.

Referring first to FIG. 1, a reverse hydrocyclone 10 is constructed as a canister assembly. A reject chamber is located between support plates 12 and 14, and separating chamber 20 is located between support plates 14 and 18. An accept chamber 24 is located between support plates 18 and 22. A reject seal 26 is snapped onto a helical feed inlet 28, which in turn is connected by pins 30 with the upper end of a cleaner body 32. An accept seal 34 is snapped onto the lower end of the cleaner body 32. An accept cap 36 is screwed onto the lower end of the cleaner body 32 and carries a blocking finger stem 38 which supports a blocking finger head 40. The helical feed inlet 28 has an overflow orifice 42 which diverges smoothly at portion 44 to avoid sudden discharge losses and decrease the accept to reject pressure differential requirements.

In the vicinity of the underflow orifice 46, the cleaner body 32 has a conical portion 48 having an included angle of 5 degrees. The blocking finger is located centrally in the underflow orifice which defines a flow passage around which the outer pulp stream passes. The accept cap 36 has discharge holes 50 at its lower end with a total area much greater than that of the underflow orifice 46 to avoid additional pressure losses.

The blocking finger, comprising a stainless steel stem 38 and polyurethane head 40, has a peripheral edge 52 which, together with conical body portion 48 provides a narrowest portion of the flow passage for the accept heavy fraction. The top flat portion 54 of the blocking finger arrests the air core present in the centre of the cleaner together with the adjacent layer of light contaminants and displaces them upwards towards the reject opening 42.

FIG. 2 shows the major streams in a reverse cleaner in accordance with the present invention, and major dimensions thereof are shown. FIG. 3 shows a typical flow diagram of a complete cleaning system using the reverse cleaner of the present invention, and this is self-explanatory from the description and notes thereon.

FIG. 4 shows the same tonnage handled and rejected by a cleaning system utilizing a high pressure prior art reverse cleaning with a typical volume split. It may be clearly seen that the installation costs, which are proportional to the total volume handled, of the system using the prior art cleaner will be about 38% higher than the system shown in FIG. 3 utilizing the cleaner of the present invention. Energy expenditures will be even higher because power consumption will be about 212% greater than the system of FIG. 3 utilizing a reverse cleaner in accordance with the inveniton.

Typical cleaning test results and operating parameters for a reverse cleaner in accordance with the present invention are shown in Table 1.

TABLE 1

| TEST RESULTS - OPERATING PARAMETERS | | | | | | | | |
|---|---|---|---|---|---|---|---|---|
| | | EFF. = 90% | | | | TYPICAL PRESSURES | | |
| $P_F - P_A$ PSI | $Q_F$ L/MIN | $P_A - P_R$ PSI | $Q_R/Q_F$ % | $C_R/C_F$ | RR % | $P_F$ PSI | $P_A$ PSI | $P_R$ PSI |
| 10 | 93 | 8.0 | 40 | .71 | 18.4 | 23 | 13 | 5 |
| 12.5 | 104 | 7.7 | 33.5 | .60 | 20.1 | 25.2 | 12.7 | 5 |
| 15 | 113 | 7.5 | 29 | .51 | 14.8 | 27.5 | 12.5 | 5 |
| 17.5 | 123 | 8.0 | 26 | .46 | 12.0 | 30.5 | 13 | 5 |
| 20 | 131 | 9.0 | 25 | .43 | 10.8 | 34 | 14 | 5 |

$P_F$, $P_A$, $P_R$ — Feed, Accept & Reject Pressures
$Q_F$, $Q_R$ — Feed & Reject Flow Rates
$C_F$, $C_R$ — Feed & Reject consistencies & oven dried solids in volume
RR — Reject Rate, % solids in rejects to solids in feed in time
EFF — Cleaning Efficiency, overall A reverse cleaner hydrocyclone in accordance with the present invention can be operated with feed-to-accept pressure differential in the range of from about 12 to about 21 psi, i.e. similar to those used for equivalent forward cleaners, with the reject rate being controllable by varying the accept-to-reject pressure differential over the whole range of operation. The reject volumetric fraction going to the overflow may be in the range of from about 25 to about 35% and may contain from about 10 to about 20% solids.

The blocking finger and its attachment do not interfere with the accepted fraction containing clean fibres which flows in the annular space between the finger and the lower part of the cleaner body 32. The velocity of the heavy accepted fraction in the most constricted area between the cleaner body 32 and the head 40 of the blocking finger is higher by not more than about 35% of the velocity of the light fraction in the overflow orifice. The velocity of the heavy accepted fraction in the underflow orifice below the head 40 of the blocking finger is about 20% less than in the most constricted area, and is still over about 50% less in the discharge holes 50 in the cap 36 which supports the blocking finger. The velocity in the overflow orifice should not fall below about 3 m/s, and the included angle of the conical portion of the cleaner body 32 from the head 40 of the blocking finger to the underflow orifice should be from about 4 to about 6 degrees, preferably about 5 degrees.

The present invention enables, for example, a 78 mm diameter forward cleaner to be remodelled into a reverse cleaner in accordance with the invention by making the overflow area about 4.5 times smaller and by increasing the underflow area by about 45%, with the feed inlet design and cross-sectional area being unchanged.

In a multistage system, which usually has three stages, the rejected amount of liquid passing to the subsequent stages utilizing the present invention is much less than in prior art systems, with fewer cleaners consequently being required since the pulp suspension is less diluted. Normally, with the present invention, no thickening will be required between the stages. In a typical cleaning system in accordance with the present invention, about 20% less cleaner equipment is required compared to the prior art, thereby proportionately decreasing both installation and operating costs. Also, with the present invention, the same standardized canisters can be used for a reverse cleaner in accordance with the invention as are used for a forward cleaner in accordance with the prior art.

Other embodiments of the invention will be readily apparent to a person skilled in the art, the scope of the invention being defined in the appended claims.

What I claim as new and desire to protect by Letters Patent of the United States is:

1. A reverse hydrocyclone cleaner for removing light contaminants from pulp slurry, comprising:

a housing defining a hydrocyclone separating chamber, means for feeding pulp slurry into the separating chamber adjacent an upper end thereof to form an outer helically and downwardly moving slurry stream relatively free from light contaminants, an inner pulp stream containing a substantial amount of said light contaminants and an air core within said inner stream, an overflow orifice adjacent an upper end of the separating chamber, an underflow orifice adjacent a lower end of the separating chamber to remove said outer pulp stream relatively free from light contaminants, and a centrally located blocking finger in the underflow orifice defining a flow passage around which the outer pulp stream passes, said blocking finger having a top portion with a substantially flat upper surface of sufficient diameter to define lower limits of both the air core and the inner pulp stream and cause the inner pulp stream containing a substantial amount of said light contaminants to travel upwardly in the separating chamber in a helical manner around the air core to and through the overflow orifice, said separating chamber having a conical section adjacent the blocking finger, and said top portion of the blocking finger and said conical section providing therebetween a narrowest portion of said flow passage in the underflow orifice for the outer pulp stream, said top portion having a diameter which is from about 15 to about 25% of the diameter of the separating chamber at entry of the pulp slurry adjacent the upper end thereof and which blocks from about 15 to about 25% of the area of the underflow orifice.

2. A reverse hydrocyclone cleaner according to claim 1 wherein said concical section of the separating chamber has an included angle of from about 4 to about 6 degrees.

3. A process for removing light contaminants from pulp slurry, comprising:

feeding the pulp slurry into an upper end of a hydrocyclone separating chamber to form an outer helically and downwardly moving stream relatively free from light contaminants, an inner pulp stream containing a substantial amount of said light contaminants, and an air core within said inner stream, removing said outer stream relatively free from light contaminants through an underflow orifice adjacent a lower end of the separating chamber, providing an overflow orifice adjacent the upper end of the separating chamber, providing a centrally located blocking finger in the underflow orifice defining a flow passage around which the outer pulp stream passes, said blocking finger having a top portion with a substantially flat upper surface with sufficient diameter to define lower limits of both the air core and the inner pulp stream and cause the inner pulp stream containing a substantial amount of said light contaminants to travel upwardly in the separating chamber in a helical manner around the air core to the overflow orifice, said separating chamber having a conical section adjacent the blocking finger, and said top portion of the blocking finger and said conical section providing therebetween a narrowest portion of said flow passage in the underflow orifice for the outer pulp stream, said top portion having a diameter which is from about 15 to about 25% of the diameter of the separating chamber at entry of the pulp slurry adjacent the upper end thereof and which blocks from about 15 to about 25% of the area of the underflow orifice, and removing the inner pulp stream containing a substantial amount of light contaminants and air through the overflow orifice.

4. A process according to claim 3 including providing the conical section of the separating chamber with an included angle of from about 4 to about 6 degrees.

5. A process according to claim 3 including feeding the pulp slurry into the upper end of the separating chamber at a range in the pressure of from about 20 to about 35 psig, maintaining a pressure in the range of from about 8 to about 15 psig at the underflow orifice to remove the outer pulp stream relatively free from light contaminants, and maintaining a pressure in the range of from about 1 to about 6 psig at the overflow orifice to remove the inner pulp stream containing a substantial amount of light contaminants and air.

6. A process according to claim 5 including maintaining the pressure of the underflow orifice lower than the feed pressure by an amount in the range of from about 12 to about 21 psi.

* * * * *